(12) United States Patent
Wu

(10) Patent No.: US 8,105,655 B2
(45) Date of Patent: Jan. 31, 2012

(54) FAST AND LOW TEMPERATURE CURED POLYIMIDE FUSER BELT

(75) Inventor: Jin Wu, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 827 days.

(21) Appl. No.: 12/164,613

(22) Filed: Jun. 30, 2008

(65) Prior Publication Data

US 2009/0324959 A1 Dec. 31, 2009

(51) Int. Cl.
*B05D 3/02* (2006.01)
(52) U.S. Cl. ............. 427/385.5; 427/384; 427/387; 427/407.1
(58) Field of Classification Search .......... None
See application file for complete search history.

(56) References Cited

U.S. PATENT DOCUMENTS

| | | | | |
|---|---|---|---|---|
| 6,090,326 | A * | 7/2000 | Hirohata et al. | 264/310 |
| 2010/0055365 | A1 * | 3/2010 | Nakajima et al. | 428/36.9 |

FOREIGN PATENT DOCUMENTS

| | | |
|---|---|---|
| JP | 11012500 | 1/1999 |
| JP | 2005258432 | 9/2005 |
| WO | WO2008/044643 | * 4/2008 |
| WO | 2008120787 | 10/2008 |

OTHER PUBLICATIONS

Abstracts and partial machine translation of JP2004-291367, Oct. 2004.*
European Patent Office, European Search Report, European Patent Application No. 09171837.9, Mar. 30, 2010, 3 Pages.

* cited by examiner

*Primary Examiner* — Erma Cameron
(74) *Attorney, Agent, or Firm* — MH2 Technology Law Group LLP

(57) ABSTRACT

Exemplary embodiments provide a belt material and methods for making and using the belt material. In one embodiment, the belt material can be a fast and low-temperature cured polyimide belt that includes a plurality of thermally-conductive species dispersed in a polyimide resin. In another embodiment, the belt material can include one or more layers formed over the fast and low-temperature cured polyimide belt substrate that includes a plurality of thermally-conductive species dispersed in the polyimide resin. For example, the fast and low-temperature cured polyimide belt or belt substrate can be cured at a temperature of about 300° C. or lower for a time length of less than about one hour. The belt material can be suitable for use in an electrostatographic printing process as a fuser belt, a fixing belt, a pressure belt, and/or a release agent donor belt.

14 Claims, 2 Drawing Sheets

FAST AND LOW TEMPERATURE CURED POLYIMIDE FUSER BELT

FIELD OF THE INVENTION

This invention relates generally to a belt material and methods for making and using the belt material and, more particularly, to a fast and low temperature cured belt material used for electrostatographic devices and processes.

BACKGROUND OF THE INVENTION

In the electrostatographic printing industry, there is a trend of using fuser belts to replace fuser rolls due to the compact structure, low energy consumption and high speed of the fuser belts. For example, current fuser belts include polyimide belts made by coating and curing from a polyimide-based solution. In order to obtain desired properties of the resulting polyimide belts, especially mechanical properties, the curing process is often performed at high temperatures of over 300° C. for a long time. For example, one conventional curing process includes a bake at about 380° C. for 1 hour, which in turn follows one or more pre-bakes for about 1 to 2 hours.

In some cases, conventional polyimide materials may be free of curing (e.g., not curable), or may be partially cured at low temperatures. However, such polyimide materials can not provide desired mechanical strength for use as a belt.

For manufacturing ease and energy savings without sacrificing the material characteristics, there is a need to provide a fast and low temperature cured belt material and methods for making and using the belt material.

SUMMARY OF THE INVENTION

According to various embodiments, the present teachings include a method for making a belt material. The belt material can be formed by first forming a coating dispersion that contains a plurality of thermally conductive species in a liquid polyimide. The coating dispersion can then be coated on a support and further cured at a temperature of about 300° C. or lower to form the belt material.

According to various embodiments, the present teachings also include a belt material. The belt material can be formed by first forming a coating dispersion that contains a plurality of thermally conductive species in a liquid polyimide. The coating dispersion can then be coated on a support and cured at a low temperature of about 300° C. or lower to form the belt material.

According to various embodiments, the present teachings further include a fuser belt. The fuser belt can include one layer of a fast and low temperature cured polyimide belt material or use the fast and low temperature cured polyimide belt material as a belt substrate. One or more other layers can then be formed over the belt substrate.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

DESCRIPTION OF THE EMBODIMENTS

Figure 1:
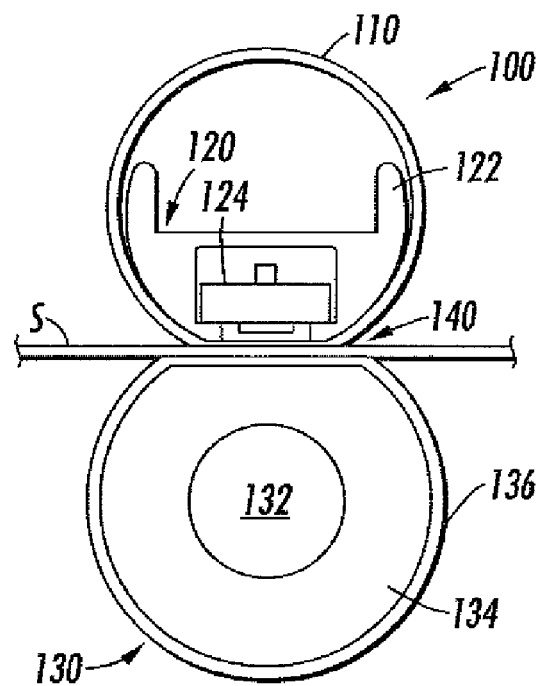
FIG. 1 depicts a cross sectional view of a belt fuser assembly including a fuser belt in accordance with the present teachings.

Reference will now be made in detail to the present embodiments (exemplary embodiments) of the invention, an example of which is illustrated in the accompanying drawings. Wherever possible, the same reference numbers will be used throughout the drawings to refer to the same or like parts. In the following description, reference is made to the accompanying drawings that form a part thereof and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

While the invention has been illustrated with respect to one or more implementations, alterations and/or modifications can be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. The term "at least one of" is used to mean one or more of the listed items can be selected.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume values as defined earlier plus negative values, e.g. −1, −1.2, −1.89, −2, −2.5, −3, −10, −20, −30, etc.

Exemplary embodiments provide a belt material and methods for making and using the belt material. In one embodiment, the belt material can be a fast and low-temperature cured polyimide belt that includes a plurality of thermally-conductive species dispersed in a polyimide resin. In another embodiment, the belt material can include one or more layers formed over the fast and low-temperature cured polyimide belt substrate that includes a plurality of thermally-conductive species dispersed in the polyimide resin. For example, the fast and low-temperature cured polyimide belt or belt substrate can be cured at a temperature of about 300° C. or lower for a time length of less than about one hour.

In various embodiments, the disclosed belt material can be used as a "fuser belt" in the electrostatographic printing industry. For illustrative purposes, the term "fuser belt" is referred to throughout the description herein, however, it is intended that the term "fuser belt" also encompasses other belt-like structure suitable for use in an electrostatographic printing device or process including, but not limited to, a pressure applying mechanism belt, a release agent donor belt or any fixing belt.

FIG. 1 depicts a cross sectional view of a belt fuser assembly 100 having a fuser belt in accordance with the present teachings. One of ordinary skill in the art will understand that the disclosed fuser belt can be used in other belt fuser assembly scheme known to one of ordinary skill in the art. In addition, it should be readily apparent to one of ordinary skill in the art that the fuser assembly 100 depicted in FIG. 1 represents a generalized schematic illustration and that other elements/belts can be added or existing elements/belts can be removed or modified.

The fuser assembly 100 can include, e.g., an endless flexible fuser belt 110 formed in accordance with the present teachings. The fuser assembly 100 can further include a heater assembly 120 and a backup member in an exemplary form of a roll 130. In the illustrated embodiment, the backup roll 130 can be driven and the fuser belt 110 can be an idler belt. However, one of ordinary skill in the art can understand that, the drive scheme can be reversed. The fuser belt 110 and the backup roll 130 can define a fuser nip 140 there between.

Heater assembly 120 can include a high temperature housing 122, e.g., formed from a polymeric material such as a liquid crystal polymer and a ceramic heater 124 can be fixed to the housing 122. The heater 124 can further include, e.g., a ceramic substrate formed from alumina, a resistive ink pattern provided on the ceramic substrate, a temperature sensor such as a thermistor, and a glass protective layer provided over the pattern and adjacent the exposed portions of the ceramic substrate. Such heater 124 can be known to one of ordinary skill in the art.

The backup roll 130 can include, e.g., an inner core 132, an inner polymeric layer 134 and an outer toner release layer or sleeve 136. The inner core 132 can be formed from a polymeric material, steel, aluminum or a like material. The inner polymeric layer 134 can be formed from, e.g., a silicone foam or rubber material. The outer release layer 136 can be formed from, e.g., PFA (polyperfluoroalkoxy-tetrafluoroethylene) or other fluoro resin material. In various embodiments, a conventional drive mechanism (not shown) can be provided for effecting rotation of the backup roll 130.

In various embodiments, a substrate transport device (not shown), such as a transport belt, can be provided to feed substrates S as shown in FIG. 1, one a time into the fuser nip 140. A toner image can be provided on each substrate via one or more imaging stations. The toner image can then be fused to the substrate S by the fuser belt 110, the ceramic heater 124 and the backup roll 130 applying heat and pressure to the substrate/toner image. In the illustrated embodiment, rotation of the backup roll 130 can effect movement of a substrate S through the fuser nip 140. Movement of the backup roll 130 and substrate S can cause the fuser belt 110 to move relative to the ceramic heater 124.

Figure 1A:
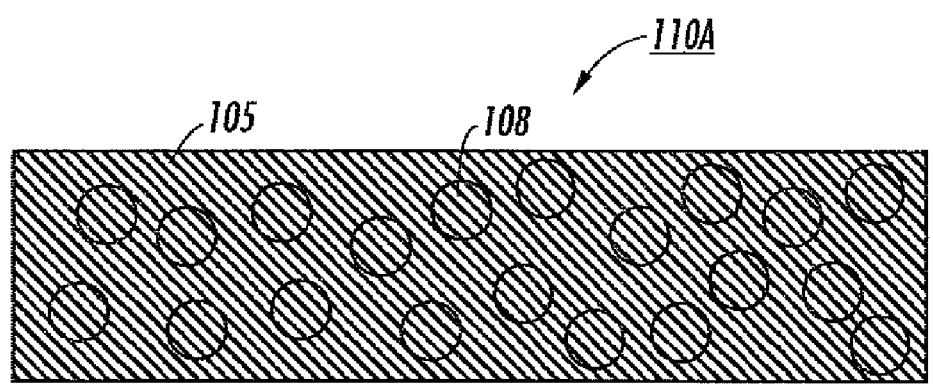
FIG. 1A is a cross sectional view of a portion of an exemplary fuser belt illustrated in FIG. 1 in accordance with the present teachings.

FIG. 1A is a cross sectional view of a portion of an exemplary fuser belt 110 illustrated in FIG. 1 in accordance with the present teachings.

As shown in FIG. 1A, the fuser belt 110 can be a polymer belt 110A, e.g., a thermally conductive polymer belt, through which heat is applied. As shown in FIG. 1A, the polymer belt 110A can be a smooth sheet or a meshed material. The polymer belt 110A can be, e.g., a seamless endless belt, though belts having seams can also be used. The thickness of the polymer belt 110A can be, for example, about 50 to about 500 micrometers. In an additional example, the thickness can be about 60 to about 400 micrometers. In a further example, the thickness of the polymer substrate can be about 70 to 300 micrometers.

In various embodiments, the polymer belt 110A can include a polymer material such as, for example, polyimide, polyester, polycarbonate, polyamide, polyamide-imide or mixtures or combinations thereof. For ease of illustration, the invention will now be described with reference to the polymer belt using a polyimide-based belt for the disclosed fuser belt (e.g., 110 of FIG. 1 and 110A of FIG. 1A) and the disclosed fuser device (e.g., the assembly 100 of FIG. 1).

For example, the polyimide-based fuser belt shown in FIG. 1A can be made by dispersing thermally conductive species 108 within the polyimide matrices 105. The thermally conductive species 108 can include, for example, boron nitride, beryllium oxide, aluminum nitride, silicon carbide, silicon nitride, alumina or silica. The thermally conductive species 108 can be dispersed in an amount ranging from about 5% to about 50% by weight of the polyimide belt.

In various embodiments, the disclosed polyimide material can possess a number average molecular weight of, for example, from about 5,000 to about 500,000, and in an additional example, from about 10,000 to about 100,000. The disclosed polyimide can possess a weight average molecular weight of, for example, from about 50,000 to about 5,000,000, and in an additional example, from about 100,000 to about 1,000,000.

During the formation of the polyimide-based fuser belt, a coating dispersion (also referred herein as coating solution or coating suspension) can be formed including, for example, a plurality of thermally-conductive species, and a polyamic acid solution using an organic polar solvent, such as N-methyl-2-pyrrolidone (NMP). The polyamic acid solution can be used to prepare polyimide resins.

The described polyamic acid solution is also known as a "liquid polyimide". For example, the liquid polyimide can be commercially available from Richard Blaine International, Incorporated (RBI), Inc., Reading, Pa., having a trade name and product number as VTEC™ PI 1388. Other product numbers including PI 080-051, 851, 302, 203, 201 or PETI-5 under the designation of VETC™ can also be used. For example, VTEC liquid polyimide can provide a stable and long shelf life, while the resulting VTEC polyimide can be defect free with minimal lot-to-lot variation.

While not being desired to be limited by any theory, it is believed that the disclosed polyimide can be prepared by the reaction of an aromatic diamine with an aromatic dicarboxylic acid, where either amine or carboxylic acid or both contains a C=C substituting group. Thus, two reactions can occur during the low temperature curing of about 300° C. or less. The two reactions can include: (1) a nominal but incomplete imidization; and (2) free radical polymerization of the substituting C=C groups, which allows a high tensile strength. Note that the disclosed polyimide material can be different from conventional polyimides. For example, conventional polyimide can be cured by a single imidization reaction without any other crosslinking process (e.g., free radical polymerization). For this reason, conventional polyimide belts require a curing temperature that is above 300° C. in order to obtain a high tensile strength, while the disclosed polyimide belts can be cured at low temperatures for a short period of time. For example, the subsequent curing temperature can range from about 150° C. to about 260° C. and the subsequent curing can be accomplished in about 10 minutes to about 120 minutes. In some embodiments, curing can be accomplished in about 40 to about 100 minutes. In other embodiments, the curing time can range from about 20 minutes to about 60 minutes.

The liquid polyimide, or the polyamic acid solution, can be mixed with the thermally-conductive species to form the coating dispersion. In various embodiments, the coating dispersion can be prepared via a mechanical processing, e.g., an agitation, sonication or attritor ball milling/grinding. The prepared coating dispersion can then be coated and cured, in some cases, can be further welded to form a belt.

The coating dispersion can be coated on a coating support, such as, for example, an outer surface of a metal mandrel, an inner circumference of a cylinder or a plate substrate. The resulting polyimide belt can thus include, e.g., a tubular form or non-tubular form such as a belt form depending on the shape of the coating support. As used herein, the term "coat" refers to a technique or a process for applying, forming, or depositing the disclosed dispersion on a material or a surface of the coating support. Therefore, the term "coating" or "coating technique" is not particularly limited in the present teachings, and extrusion coating, bar coating, dip coating, mold coating, painting, brush coating, roller coating, pad application, spray coating, spin coating, casting, or flow coating can be employed. The coating support can include a material, e.g., a glass, a metal or any other suitable material.

The coated coating dispersion can then be cured and dried at low temperatures in a short time length to form the polyimide resins. The curing temperatures can be lower than the temperature used in the prior art, which still provide desired properties, especially mechanical properties, to the resulting belt. For example, temperatures used in the prior art for forming polyimide-based belt can be about 380° C. or higher, while the disclosed polyimide-based belt can be cured at a temperature less than about 380° C., for example, about 300° C. or lower. In an additional example, the curing temperature can be about 250° C. or lower. In a further example, the curing temperature can be about 200° C. or lower.

In various embodiments, a step-wise curing at low temperatures can be performed. For example, a coated member can be placed in a convection oven at about 50° C. to about 150° C. for about 20 to about 40 minutes; and the temperature can then be increased to about 150° C. to about 250° C. and further curing can take place for about 20 to about 80 minutes. In an exemplary embodiment, the coated member can be placed in the convection oven at about 100° C. for about 20 minutes and further cured at about 204° C. for about 20 minutes. Other curing schedules can be possible. Curing schedules known to those skilled in the art can be within the scope of embodiments herein. In various embodiments, following the curing process, the cured member can be cooled, e.g., in a water bath and/or at a room temperature of about 20° C. to about 25° C.

In embodiments when the coating dispersion is coated on a non-tubular coating support, the cured polyimide can be further welded to form a fuser belt. For example, standard welding process, such as an ultrasonication weld, can be used to form a fuser belt or other fixing belt.

In various embodiments, the fuser belt made by the method described herein can provide desired mechanical properties. For example, the resulting fuser belt can have a tensile strength ranging from about 200 to about 500 MPa or higher; or a thermal conductivity of about 0.10 to about 0.50 W/m·K or higher.

Figure 1B:
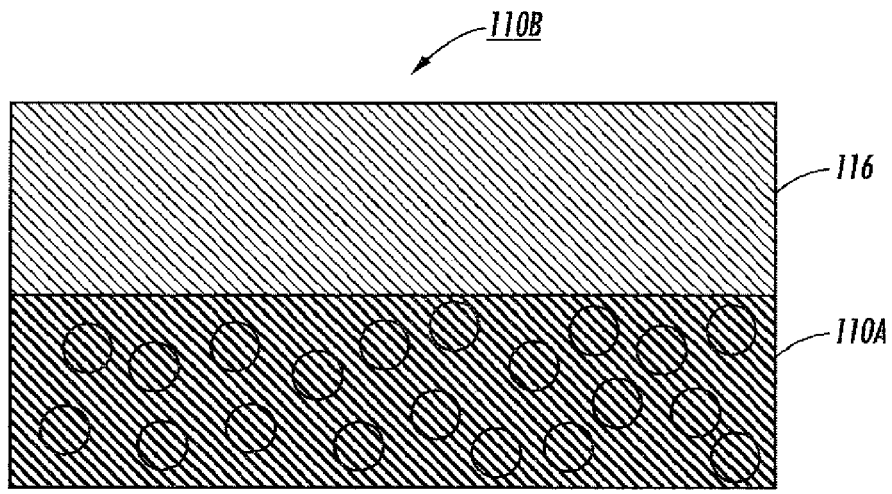
FIG. 1B is a cross sectional view of a portion of another exemplary fuser belt illustrated in FIG. 1 in accordance with the present teachings.
Figure 1C:
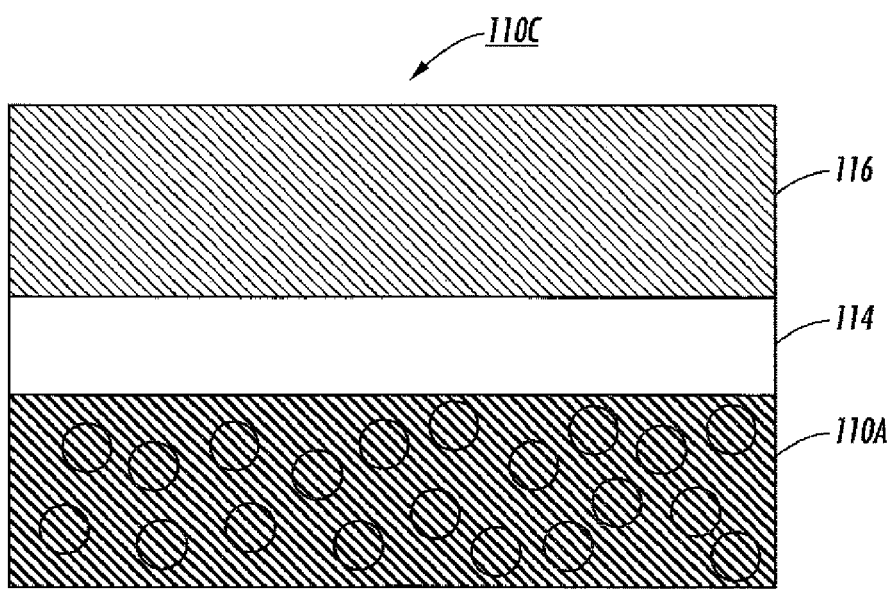
FIG. 1C is a cross sectional view of a portion of an additional exemplary fuser belt illustrated in FIG. 1 in accordance with the present teachings.

Referring back to FIG. 1, the fuser belt 110 can include a layered structure as shown in FIG. 1B and FIG. 1C. The layered structures 110B-C can include, e.g., a polymer belt substrate that can be similar to the polymer belt 110A of FIG. 1A including thermally conductive particles dispersed in the exemplary polyimide. That is, the polymer belt 110A can also be used as a belt substrate for a multi-layered fuser belt used in the belt fuser assembly 100 of FIG. 1.

In an exemplary embodiment as shown in FIG. 1B, the fuser belt 110 can include a top layer 116, such as a silicone rubber layer or a fluoropolymer layer formed on the disclosed polymer belt substrate 110A.

In another exemplary embodiment as shown in FIG. 1C, the fuser belt 110 can have one or more layer disposed between the top layer 116, such as a fluoroplastic layer, and the disclosed polymer belt substrate 110A. For example, a compliant layer 114, such as a silicone rubber layer, can be disposed between the top layer 116 and the disclosed polymer belt substrate 110A.

As described herein the top layer 116 of the fuser belt 110 can include e.g., fluoropolymers. The fluoropolymers can include, but are not limited to, fluoroplastics including PFA (polyfluoroalkoxypolytetrafluoroethylene), PTFE (polytetrafluoroethylene), or FEP (fluorinated ethylenepropylene copolymer), and/or fluoroelastomers including copolymers of hexafluoropropylene (HFP) and vinylidene fluoride (VDF or VF2); terpolymers of tetrafluoroethylene (TFE), vinylidene fluoride (VDF) and hexafluoropropylene (HFP); or tetrapolymers including TFE, VF2, HFP. These fluoropolymers can be commercially available from various designations as Teflon® PFA, Teflon® PTFE, Teflon® FEP, Viton A®, Viton®-B, and Viton®-GF, Viton E®, Viton E 60C®, Viton E430®, Viton 910®, Viton GH® and Viton GF®. The Teflon® and Viton® designations are Trademarks of E.I. DuPont de Nemours, Inc.

Other commercially available fluoropolymers can include, for example, Fluorel 2170®, Fluorel 2174®, Fluorel 2176®, Fluorel 2177® and Fluorel LVS 76®, Fluorel® being a Trademark of 3M Company. Additional commercially available materials can include Aflas® a poly(propylene-tetrafluoroethylene) and Fluorel II® (LII900) a poly(propylene-tetrafluoroethylenevinylidenefluoride) both also available from 3M Company, as well as the Tecnoflons identified as For-60KIR®, For-LHF®, NM®, For-THF®, For-TFS®, TH®, and TN505®, available from Montedison Specialty Chemical Company.

EXAMPLES

Example 1

Preparation of a Polyimide Belt or a Polyimide Belt Substrate

A coating dispersion was prepared via Attritor grinding at about 800 rpm for about 3 hours using stainless shots as media. The coating dispersion included the liquid polyimide VTEC™ PI 1388, commercially available from RBI, Inc., Reading, Pa., in an organic solvent N-methyl-2-pyrrolidone (NMP). The coating dispersion further included boron nitride (BN) nanopowder ZG from ZYP Coatings, Oak Ridge, Tenn. (polyimide/BN=80/20) in the NMP solution. The dispersion was then coated on a glass via bar-coating, and then first cured at about 100° C. for about 20 minutes and then cured at about 204° C. for about 20 minutes. The cooled sample out of curing oven was immersed into a water bath overnight, and a standalone fuser belt having a thickness of about 60 μm was automatically peeled off from the glass.

Example 2

Preparation of a Polyimide Belt or a Polyimide Belt Substrate

About 5 to about 30 wt % of boron nitride, was dispersed in a polyamic acid solution using the solvent N-methyl-2-pyrrolidone (NMP). The polyamic acid solution was a liquid polyimide VTEC™ PI 1388, commercially available from RBI, Inc., Reading, Pa. The liquid polyimide was then extrusion coated, and pre-cured at about 121° C. for about 20 minutes, and then fully cured at about 204° C. for about 20 minutes. The resulting polyimide belt was then welded using standard ultrasonication welding to form a polyimide fuser belt.

Example 3

Preparation of a Polyimide Belt or a Polyimide Belt Substrate

The VTEC™ PI 1388 liquid polyimide having about 5% to about 30 wt % boron nitride in example 2 was dip-coated on an aluminum tube, and pre-cured at about 121° C. for a short period of time, and then fully cured at about 204° C. for about 20 minutes. Seamless polyimide belt or the polyimide belt substrate for a multi-layered belt was then obtained.

Example 4

Properties of the Polyimide Belt or Polyimide Belt Substrate

Table 1 compares properties of the disclosed fast and low temperature cured polyimide fuser belt with one of current commercially-available DuPont's KAPTON HN film. As shown in Table 1, the disclosed polyimide belt/belt substrate possessed comparable or superior properties, for example, dimensional stability (see the lower elongation percentage), less humidity sensitivity (see the water absorption percentage) and lower surface friction (see the dynamic friction coefficient).

TABLE 1

| | Cured 1 mil polyimide film | |
| --- | --- | --- |
| Cure conditions | VTEC ™ PI 1388 204° C./20 min | Kapton HN 316° C./60 min |
| Tensile Strength (kg/mm$^2$) | 14 | 16.8 |
| Elongation (%) | 15 | 40 |
| Modulus (kg/mm$^2$) | 257 | 255 |
| Water Absorption (%) | <1 | 4% |
| Coefficient of Thermal Expansion (ppm/° C.) | 38 | 32 |
| Coefficient of Thermal Conductivity (cal/cm · sec · ° C.) | $35 \times 10^{-5}$ | $29 \times 10^{-5}$ |
| Dielectric Constant (23° C., 10$^6$ Hz) | 3.2 | 3.4 |
| Volume Resistivity (ohm · cm) | $10^{+16}$ | $10^{+17}$ |
| Surface Resistivity (ohm/sq) | $10^{+15}$ | $10^{+16}$ |
| Dynamic Friction Coefficient | 0.35 | 0.48 |
| Glass Transition Temperature (° C.) | >320 | 360° C. |

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for making a belt material comprising:
   forming a coating dispersion comprising a plurality of thermally conductive species in a liquid polyimide, wherein the liquid polyimide comprises a —C=C— substituting group;
   coating the formed coating dispersion on a support; and
   heating the support comprising the coating dispersion at a temperature of about 300° C. or lower to conduct an incomplete imidization of the liquid polyimide and a free radical polymerization of the substituting —C=C— group to form the belt material.

2. The method of claim 1, further comprising heating the coated dispersion for about 120 minutes or shorter.

3. The method of claim 1, further comprising heating the coated support first at a temperature of about 50° C. to about 150° C. for about 20 to about 40 minutes and then at a temperature of about 150° C. to about 250° C. for about 20 to about 80 minutes.

4. The method of claim 1, wherein the liquid polyimide possesses a number average molecular weight of from about 10,000 to about 100,000, and a weight average molecular weight of from about 100,000 to about 1,000,000.

5. The method of claim 1, wherein the plurality of thermally conductive species comprises one or more of boron nitride, beryllium oxide, aluminum nitride, silicon carbide, silicon nitride, alumina or silica.

6. The method of claim 1, wherein the plurality of thermally conductive species is present in an amount from about 5 percent to about 50 percent by weight of the liquid polyimide.

7. The method of claim 1, further comprising mechanically processing the coating dispersion using one or more of sonication, agitation and attritor ball milling.

8. The method of claim 1, wherein coating the support comprises one or more techniques selected from the group consisting of extrusion coating, bar coating, dip coating, mold coating, painting, brush coating, roller coating, pad application, spray coating, spin coating, casting, and flow coating.

9. The method of claim 1, wherein the coating support is in a form of a cylinder, or a plate.

10. The method of claim 1, further comprising welding the cured belt material when the coating support is non-tubular.

11. The method of claim 1, further comprising cooling the cured belt material in a water bath.

12. The method of claim 1, further comprising forming a fuser belt by forming a top layer on the belt material, wherein the top layer comprises one of a fluoropolymer and a silicone rubber.

13. The method of claim 1, further comprising forming a fuser belt by forming a top layer over a compliant layer, the compliant layer formed over the belt material.

14. The method of claim 13, wherein the top layer comprises a fluoropolymer and the compliant layer comprises a silicone rubber.

* * * * *